United States Patent
Banerjee et al.

(10) Patent No.: US 9,379,373 B2
(45) Date of Patent: Jun. 28, 2016

(54) NICKEL-ZINC FLOW BATTERY

(71) Applicant: Research Foundation of the City University of New York, New York, NY (US)

(72) Inventors: Sanjoy Banerjee, New York, NY (US);
Yasumasa Ito, New York, NY (US);
Martin Klein, New York, NY (US);
Michael E. Nyce, Southbury, CT (US);
Daniel Steingart, New York, NY (US);
Robert Plivelich, Waterbury, CT (US);
Joshua Gallaway, Astoria, NY (US)

(73) Assignee: RESEARCH FOUNDATION OF THE CITY UNIVERSITY OF NEW YORK, New York, NY (US)

( * ) Notice: Subject to any disclaimer, the term of this patent is extended or adjusted under 35 U.S.C. 154(b) by 617 days.

(21) Appl. No.: 13/667,378

(22) Filed: Nov. 2, 2012

(65) Prior Publication Data

US 2013/0113431 A1    May 9, 2013

Related U.S. Application Data

(63) Continuation of application No. 13/501,673, filed as application No. PCT/US2010/052582 on Oct. 14, 2010.

(60) Provisional application No. 61/251,355, filed on Oct. 14, 2009.

(51) Int. Cl.
*H01M 2/38* (2006.01)
*H02J 7/00* (2006.01)
(Continued)

(52) U.S. Cl.
CPC *H01M 2/38* (2013.01); *H01M 2/40* (2013.01);
*H01M 4/32* (2013.01); *H01M 4/661* (2013.01);
*H01M 4/667* (2013.01); *H01M 10/0481* (2013.01); *H01M 10/281* (2013.01);
(Continued)

(58) Field of Classification Search
CPC .................................. H01M 2/38; H02J 7/00
USPC ........................................................ 320/134
See application file for complete search history.

(56) References Cited

U.S. PATENT DOCUMENTS 3,930,882 A    1/1976    Ohsawa et al.
4,015,053 A    3/1977    Von Krusnstierna
(Continued)

OTHER PUBLICATIONS

Zhang et al., "Study of Zinc Electrodes for Single Flow Zinc/Nickel Battery Application", Journal of Power Sources, vol. 179, pp. 381-387 (2008).
(Continued)

*Primary Examiner* — Richard Isla Rodas
*Assistant Examiner* — Dung V Bui
(74) *Attorney, Agent, or Firm* — Hoffmann & Baron, LLP (57) ABSTRACT

A nickel-zinc battery includes a battery housing, a nickel oxide positive electrode supported in the battery housing, a metal substrate negative electrode supported in the battery housing, a spacer disposed between the positive and negative electrodes, an electrolyte contained within the battery housing and a means for circulating electrolyte in fluid communication with the housing for circulating the electrolyte between the positive and negative electrodes. The electrolyte contains zinc and the metal substrate is adapted for deposition of the zinc during charging of the battery. The spacer maintains the positive electrode in a spaced relationship apart from the negative electrode.

13 Claims, 7 Drawing Sheets

(51) Int. Cl.
*H01M 2/40* (2006.01)
*H01M 4/32* (2006.01)
*H01M 4/66* (2006.01)
*H01M 10/04* (2006.01)
*H01M 10/28* (2006.01)
*H01M 10/30* (2006.01)
*H01M 10/44* (2006.01)

(52) U.S. Cl.
CPC .............. *H01M10/30* (2013.01); *H01M 10/44* (2013.01); *H02J 7/00* (2013.01); *H02J 7/0057* (2013.01); *Y02E 60/124* (2013.01)

(56) References Cited

U.S. PATENT DOCUMENTS

| | | | |
|---|---|---|---|
| 4,039,729 A | 8/1977 | Benczur-Urmossy et al. | |
| 4,076,909 A * | 2/1978 | Lindstrom | H01M 10/20 429/207 |
| 4,312,931 A * | 1/1982 | Witherspoon et al. | 429/229 |
| 4,313,802 A * | 2/1982 | Shibuya et al. | 205/101 |
| 4,324,621 A * | 4/1982 | Kerby | 205/83 |
| 4,358,517 A | 11/1982 | Jones | |
| 4,372,823 A * | 2/1983 | Church | H01M 4/244 205/333 |
| 4,515,663 A * | 5/1985 | Strom | C25D 3/565 205/245 |
| 4,592,973 A * | 6/1986 | Pemsler | C25B 13/08 429/206 |
| 4,663,255 A | 5/1987 | Lodewijk | |
| 5,215,836 A | 6/1993 | Eisenberg | |
| 5,228,958 A | 7/1993 | Goldstein et al. | |
| 5,453,336 A | 9/1995 | Adler et al. | |
| 5,471,554 A * | 11/1995 | Rukavina et al. | 385/131 |
| 5,520,851 A * | 5/1996 | Yu | C23C 14/08 106/1.28 |
| 5,641,591 A * | 6/1997 | Kawakami et al. | 429/231.5 |
| 5,780,196 A * | 7/1998 | Fujiwara et al. | 430/137.19 |
| 5,863,676 A | 1/1999 | Charkey et al. | |
| 6,013,390 A * | 1/2000 | Kimiya | H01M 4/32 429/206 |
| 8,039,150 B2 * | 10/2011 | Burchardt | H01M 4/244 429/217 |
| 2003/0162095 A1* | 8/2003 | Huang et al. | 429/246 |
| 2004/0067410 A1* | 4/2004 | Jones | H01M 2/38 429/51 |
| 2006/0046135 A1 | 3/2006 | Huang | |
| 2006/0063065 A1* | 3/2006 | Clarke | H01M 4/8631 429/105 |
| 2007/0077485 A1* | 4/2007 | Takamura | H01M 2/0255 429/82 |
| 2010/0159324 A1* | 6/2010 | Irvin | H01M 4/13 429/220 |
| 2010/0291439 A1* | 11/2010 | Phillips et al. | 429/226 |
| 2011/0120879 A1* | 5/2011 | Buschmann | 205/339 |
| 2013/0113431 A1* | 5/2013 | Banerjee et al. | 320/134 |

OTHER PUBLICATIONS

Millot et al., "Development of Ni—Zn Cells", Journal of Power Sources, vol. 34, pp. 243-255 (1991).

McBreen, "Nickel/Zinc Batteries", Journal of Power Sources, vol. 51, pp. 37-44 (1994).

McLarnon et al., "The Secondary Alkaline Zinc Electrode", J. Electrochem. Soc., vol. 138, No. 2, pp. 645-664 (1991).

\* cited by examiner

NICKEL-ZINC FLOW BATTERY

CROSS-REFERENCE TO RELATED APPLICATIONS

This application is a continuation of U.S. application Ser. No. 13/501,673, filed on Apr. 12, 2012, which claims the benefit under 35 U.S.C. §371 of PCT Application Number PCT/US/2010052582, filed on Oct. 14, 2010, which claims the benefit of U.S. Provisional Application No. 61/251,355, filed on Oct. 14, 2009, the specifications of which are incorporated by reference herein in its entirety for all purposes.

BACKGROUND OF THE INVENTION

The present invention relates generally to the field of rechargeable batteries, and more specifically to a cell design, electrolyte formulations and reconditioning procedures for making electrochemical cells and multi-cell batteries. Still more particularly, this invention relates to an electrolyte flow-assisted nickel zinc cell construction which is capable of much greater cycle life than cells of the prior art.

Efforts to develop the nickel-zinc (Ni—Zn) battery system date back more than 100 years, with many unsuccessful attempts made to commercialize it. The net stoichiometry of the battery on discharge is given by the equations set forth below:

|  | $E^0$ |
|---|---|
| $2NiOOH + 2H_2O + 2e^- \rightarrow 2Ni(OH)_2 + 2OH^-$ | 0.49 V |
| $Zn + 2OH^- \rightarrow Zn(OH)_2 + 2e^-$ | 1.24 V |
| $2NiOOH + 2H_2O + Zn \rightarrow 2Ni(OH)_2 + Zn(OH)_2$ | 1.73 V |

Features of the Ni—Zn system that have made such batteries attractive in the field include: 1) A high theoretical specific energy of 334 Wh/kg; 2) Good power capability (due to the rapid kinetics of the electrodes and low resistance of the electrolyte); 3) Relatively low cost anode material (zinc); and 4) Safe, non-flammable electrolyte. With respect to the low cost of the anode material, based on current metals prices (nickel at $5.58/lb, and zinc at $0.65/lb), the theoretical nickel and zinc metals cost of the system is only about $16.61/kWh.

However, there are several historical drawbacks of the system, which have precluded its widespread adoption. These generally involve shortcomings of the cycle life of the zinc electrode caused by material migration/shape change and dendritic shorting. In particular, the zinc electrode in nickel-zinc battery systems has a tendency to become misshapen due to anisotropic growth of the zinc deposited on the electrode during repeated charging.

To reduce shape change, many approaches have been tried with varying degrees of success, including modifications to the electrolyte, the zinc electrode design, or the cell design. These approaches generally involve reducing either the solubility or the concentration gradients of the zinc in the electrolyte. For example, U.S. Pat. No. 4,358,517 to Jones and U.S. Pat. No. 5,863,676 to Charkey et al. disclose methods involving the use of calcium oxide or hydroxide additives to the zinc electrode.

Another approach to improving cycle life involves modifications to the battery electrolyte. In this regard, many different additives to the electrolyte have been tried. The modifications to the electrolyte typically have as their object to reduce the solubility of zinc, and thereby reduce shape change. Typical examples of this approach include fluoride/carbonate mixtures, as disclosed in U.S. Pat. No. 5,453,336 to Adler et al., and borates, phosphates, and arsenates mixtures, as disclosed in U.S. Pat. No. 5,215,836 to Eisenberg.

To reduce the likelihood of dendritic shorting, micro-porous barrier films, positioned between the electrodes, have been tried. Most recently, micro-porous polyolefin separators, (e.g. Celgard® battery separators), have had some success, but these materials are quite expensive.

A sealed starved mode of cell operation is also thought to be beneficial with respect to elimination of dendrites. In this case, oxygen generated on the overcharge of the positive nickel oxide electrode is thought to oxidize metallic zinc dendrites. Since all zinc electrodes will evolve small amounts of hydrogen gas on standing, some means of oxidizing hydrogen is also needed in a sealed cell, or else the cell pressure will increase without limit.

L. Zhang, J. Cheng, Y. Yang, Y. Wen, X. Wang, and G. Cao, "Study of zinc electrodes for single flow zinc/nickel battery application," *Journal of Power Sources*, vol. 179, pp. 381-387 (2008) describes a nickel zinc battery with flowing electrolyte to reduce the formation of dendrites on the zinc electrodes. However, the flow rates described in this article to fully-control the non-desirable zinc growth patterns would require a great deal of energy supplied in the form of pumping work. Specifically, their work reports a linear flow velocity of 19.5 cm/s. As a result, the overall battery energy efficiency is likely to be very low in a practical battery, thereby limiting its application as a battery in most realistic scenarios.

Accordingly, it would be desirable to provide a means to avoid these zinc electrode related problems, such as shape change and dendritic shorting, and to provide a rechargeable nickel-zinc battery having a cycle life that is much greater than prior art nickel zinc batteries.

OBJECTS AND SUMMARY OF THE INVENTION

An object of the present invention is to greatly extend the cycle life of nickel-zinc batteries, which overcomes the above-mentioned problems of prior art nickel-zinc batteries.

Another object of the present invention is to provide a flowing-electrolyte configuration of a nickel-zinc battery.

Still another object of the present invention is to provide a nickel-zinc battery configuration, which will allow reconditioning cycles to effectively dissolve the entire zinc electrode in the electrolyte, thereby providing a "reset" method for the zinc electrode.

These and other objects, benefits, and advantages may be obtained by a nickel-zinc battery, which includes a battery housing, a nickel oxide positive electrode supported in the battery housing, a metal substrate negative electrode supported in the battery housing, a spacer disposed between the positive and negative electrodes, an electrolyte contained within the battery housing and a pump in fluid communication with the housing for pumping the electrolyte between the positive and negative electrodes. The electrolyte contains zinc and the metal substrate is adapted for deposition of the zinc during charging of the battery. The spacer maintains the positive electrode in a spaced relationship apart from the negative electrode.

A method for increasing the electrochemical energy producing life of a battery, according to the present invention, includes the steps of charging the battery to a charge voltage, wherein zinc oxide present in the electrolyte is deposited on the negative electrode as metallic zinc, discharging the battery to a discharge voltage to produce energy, wherein the metallic zinc deposited on the negative electrode is partially dissolved back into the electrolyte, further discharging the battery to a final voltage below the discharge voltage, wherein the metallic zinc is completely removed from the negative electrode, and circulating the flow of electrolyte between the positive electrode and the negative electrode during the steps of charging, discharging and further discharging the battery to the final voltage. In this regard, the step of further discharging preferably occurs at a rate equal to or less than C/4 and the battery is preferably discharged to a final voltage of less than 1.0V, wherein C/4 refers to the capacity of the battery (C) divided by 4 hours.

In a preferred embodiment, the battery further includes an electrolyte reservoir in fluid communication with the battery housing and the pump for storing the electrolyte. The pump preferably pumps the electrolyte at a flow rate normalized by capacity in a range between 1 cc/minute/Ah and 100 cc/minute/Ah. As a result, the battery has a roundtrip energy efficiency greater than 50%.

The metal substrate is preferably made from a metal selected from the group consisting of copper, nickel and steel. The metal substrate is further preferably plated with a metal selected from the group consisting of nickel, silver, cadmium, tin, lead and bismuth.

The spacer preferably maintains the positive electrode from the negative electrode at a distance between 0.020" and 0.200".

The electrolyte preferably comprises a mixture of caustics selected from the group consisting of sodium hydroxide, potassium hydroxide and lithium hydroxide. In this regard, the caustic concentration of the electrolyte is between 10 weight percent and 50 weight percent. The electrolyte further preferably comprises zinc in the form of zinc oxide or zinc hydroxide, wherein the zinc metal concentration is preferably between 10 g/L and 300 g/L.

The nickel oxide positive electrode can be a sintered nickel oxide electrode or a pasted nickel oxide electrode. This positive electrode can also be in the form of an oxygen electrode or an air electrode. However, any cathode material, which can be successfully operated in alkaline electrolytes, including nickel oxide, manganese dioxide, silver oxide, and air (oxygen) electrodes, can be used with the present invention.

The nickel oxide electrode can be fabricated using several methods. In one method, a porous metallic nickel plaque is made from sintering a fine nickel powder. The porous plaque is then impregnated by either chemical or electrochemical means with nickel oxide. Another embodiment of a nickel oxide electrode comprises a foamed nickel metal substrate. A slurry consisting of nickel oxide powder, various other additives, binder, and a solvent (typically water) is then pasted into the open foam structure. This composite is then dried, and calendared to a desired finished thickness.

Another form of a nickel electrode is known as a roll-bonded type. With this type of electrode, the active materials are mixed with additives, a binder, and optionally a solvent. The material is calendared, preferably in alternating length-wise and width-wise directions. This calendaring action leads to fibrillation of certain types of binder materials (notably PTFE), and leads to a fibrous web of binder which serves to hold the material together. This calendared material can then be pressed into a pierced foil or screen substrate material which serves as a current collector.

A preferred form of the Ni—Zn flow battery, as well as other embodiments, objects, features and advantages of this invention, will be apparent from the following detailed description of illustrative embodiments thereof, which is to be read in conjunction with the accompanying drawings.

DETAILED DESCRIPTION OF THE PREFERRED EMBODIMENT

Figure 1:
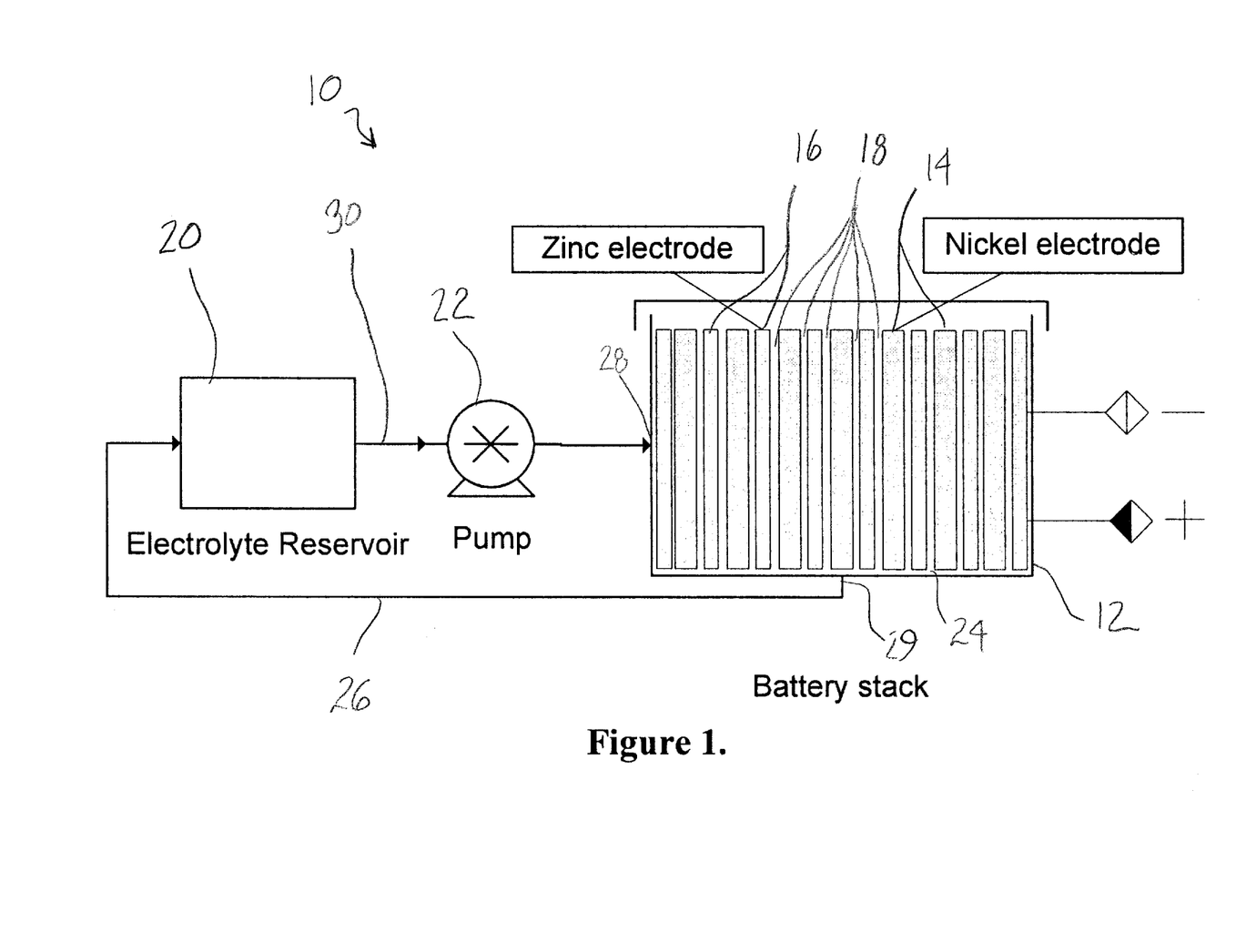
FIG. 1 is a schematic drawing of the nickel-zinc battery formed in accordance with the present invention.

Referring first to FIG. 1, the nickel-zinc battery 10 of the present invention generally includes a battery housing 12, a plurality of nickel oxide electrodes 14 contained within the housing, a plurality of metallic sheets 16 contained within the housing, a spacer construction 18 contained within the housing, an electrolyte reservoir 20, a means for circulating electrolyte 22 and an electrolyte solution 24, which flows throughout the system. As will be discussed in further detail below, the present invention further involves a reconditioning process for the zinc electrodes, which provides the means to return the zinc electrode to its original condition.

The nickel oxide electrodes 14 serve as the positive electrodes and the plurality of metallic sheets 16 serve as the negative electrodes. The metallic sheets 16 also serve as substrates onto which metallic zinc is deposited when the battery is charged. The spacer construction 18 serves to keep the positive and negative electrodes 14 and 16 from physically touching, and also provides a channel through which the electrolyte 24 flows. The electrolyte reservoir 20 can be any suitable container for storing the electrolyte 24. The electrolyte reservoir 20 and the means for circulating electrolyte 22 are preferably provided outside the battery housing 12, but are in fluid communication with the interior of the housing via suitable conduits 26 and housing ports 28 and 29. The reservoir 20 and the means for circulating electrolyte 22 are also in fluid communication with each other via a conduit 30 so that the means for circulating electrolyte can circulate the electrolyte 24 contained within the reservoir to and from the battery housing 12.

The means for circulating electrolyte 22 is preferably a pump, which pumps the electrolyte 24 through the battery housing 12. However, it is conceivable that alternative methods can be utilized for circulating the electrolyte between the positive and negative electrodes. For example, it is envisioned that an internal stirrer or mixer can be provided within the battery housing and an external drive shaft can be mechanically coupled to the stirrer or mixer to rotate same in order to circulate the electrolyte.

The nickel oxide positive electrodes 14 can be any of the types which are understood in the art. Specifically, a nickel oxide electrode 14 for use in the present invention can be made by pasting an active material mixture consisting of nickel oxide, conductive additives, binder, and solvent into a porous foam made of nickel. The solvent is then evaporated through heating, and the electrode is calendared to a final thickness.

An alternative method of producing the nickel oxide positive electrode 14 is by first creating a porous nickel structure on top of a nickel screen, a perforated nickel sheet, or a perforated nickel plated steel sheet. One method of creating such a porous structure is by sintering fine nickel powder on the metallic substrate. Once the porous structure is created, nickel oxide is then deposited in the pores of the material. One can deposit the nickel oxide by either alternatively dipping the porous structure into an aqueous nickel salt solution and then into a caustic solution to precipitate the nickel oxide, or by placing the porous structure in a bath containing nickel nitrate at an appropriate pH, (typically pH 3-5), and then polarizing the material cathodically.

A plurality of metal sheets 16 are supported in the housing to serve as negative electrodes and as substrates for deposition of metallic zinc during charge. Such metal sheets are preferably made of copper, nickel, steel, iron, or such materials coated (e.g., plated) with another material. Such coatings which are suitable include nickel, silver, cadmium, lead, bismuth, and tin.

The spacer structure 18 is used to physically separate the electrodes 14 and 16 and to provide a favorable flow path for the electrolyte 24. The spacer structure 18 is preferably made from any of a number of materials which are chemically stable in the caustic electrolyte 24 and have high electrical resistance, including but not limited to nylon, acrylonitrile-butadiene-styrene copolymer (ABS), polytetrafluroethylene (PTFE), acrylic, polyolefins (e.g., acrylic polymers), etc.

Figure 2:
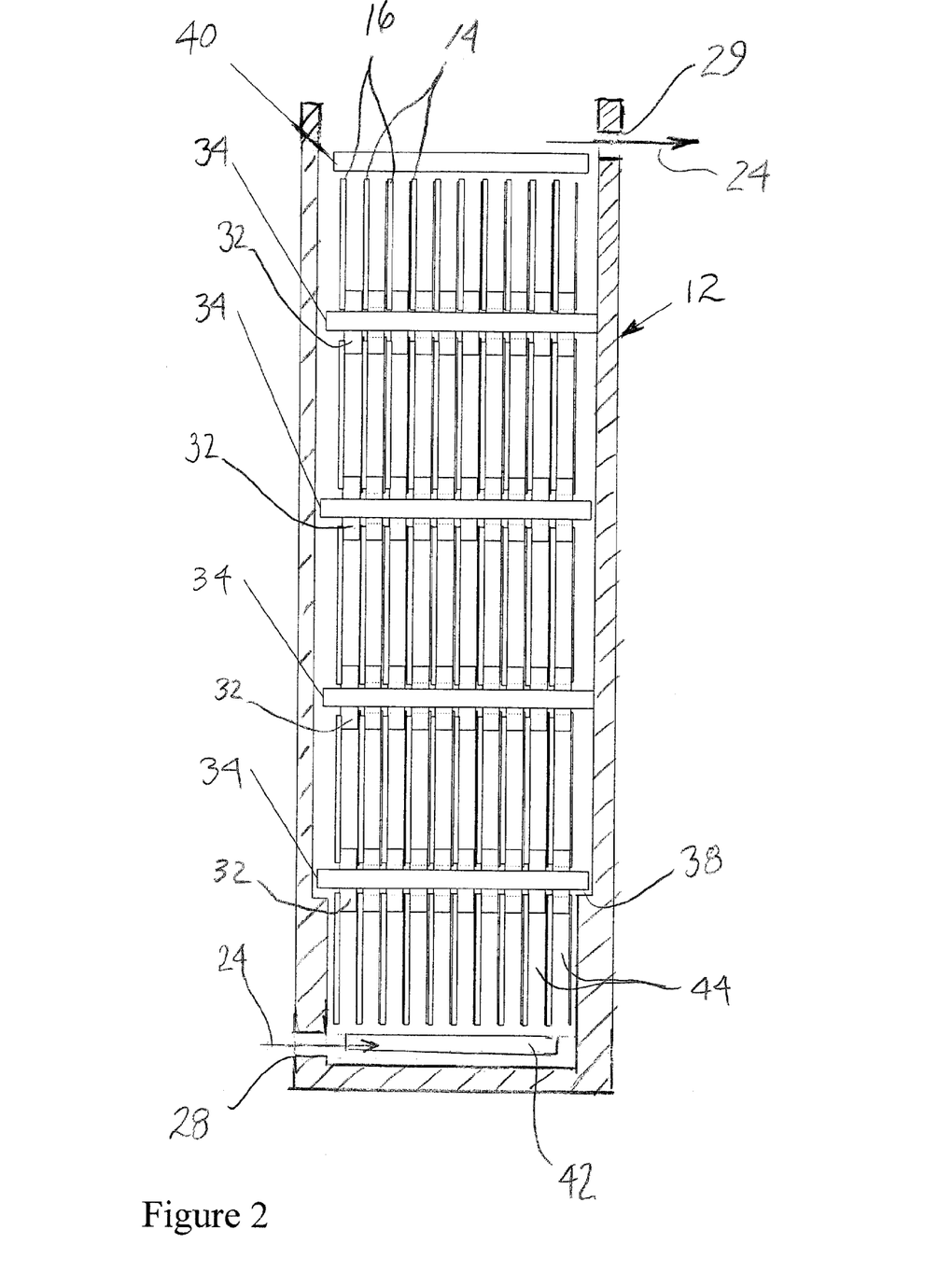
FIG. 2 is a cross-sectional view of the interior of the battery housing of the battery according to the present invention.
Figure 3:
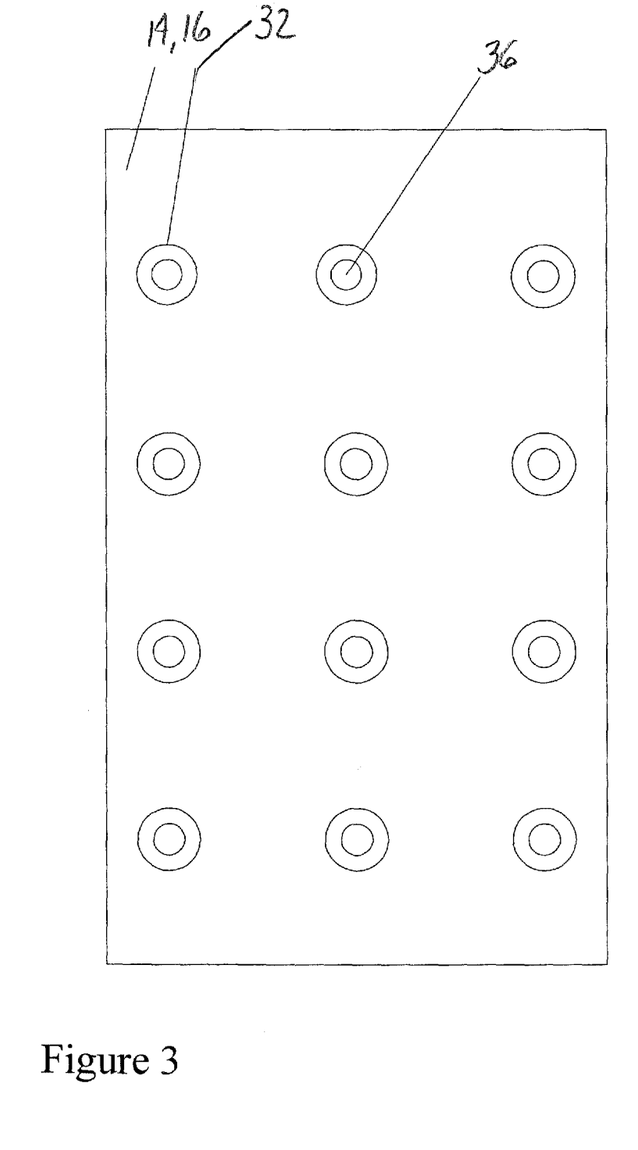
FIG. 3 is a front plan view of an electrode having insulating washers as part of a spacer structure according to the present invention.
Figure 4:
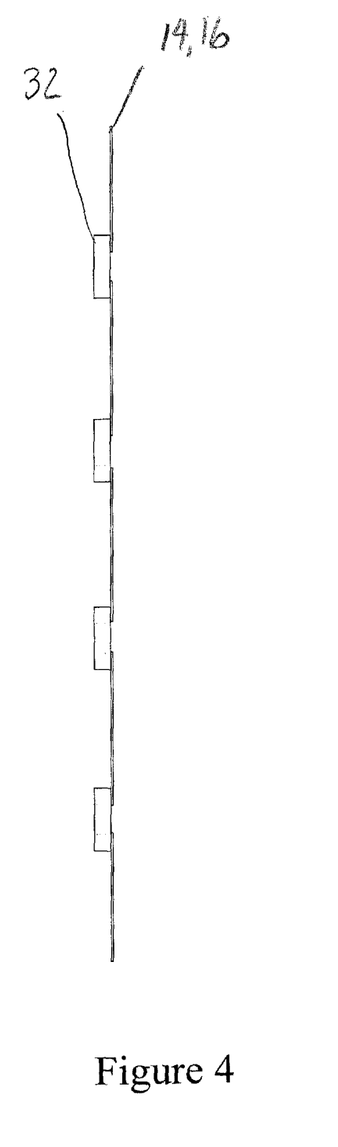
FIG. 4 is a side view of the electrode shown in FIG. 3.

As shown in FIGS. 2-4, in a preferred embodiment, the spacer structure 18 takes the form of an arrangement of insulating spacer washers 32 and tie rods 34. The insulating spacer washers 32 can be fixed to one or both of the positive and negative electrodes 14 and the respective electrodes are formed with through-holes 36 that are aligned with the through-holes of the washers. The insulating washers 32 have a thickness matching the desired spacing between adjacent electrodes 14, 16 and are fixed to the surfaces of the electrodes so that each pair of adjacent electrodes will be spaced from each other by the thickness of one spacer washer.

Each electrode 14, 16 has a matching pattern of insulating washers 32 and through-holes 36 so that when the electrodes are stacked within the battery housing, the washers and through-holes of all the electrodes will be aligned. With the washers 32 and through-holes thus aligned, tie rods 34 can be inserted through the through-holes 36 to assemble the electrode stack and keep the electrodes aligned.

The tie rods 34 can also be used to support the electrode stack within the battery housing 12. For example, as shown in FIG. 2, the inner surface of the battery housing 12 can be formed with a lip 38, upon which a row of tie rods can be seated to support the entire electrode stack within the housing.

FIG. 2 also shows an electrical bus 40, electrically connecting the electrodes 14 and 16, and a catalytic plate 42, disposed at the bottom of the battery housing 12. The bus 40 provides the electrical interface for the battery and can also be used to secure the electrode stack to the battery housing 12.

The catalytic plate 42 may consist of pure nickel metal, nickel coated steel, or steel coated with small amounts of catalysts intended to promote hydrogen evolution and is placed at the bottom of the battery housing 12 to collect isolated zinc falling from the zinc electrode 16. In conventional zinc batteries, an additional issue that can arise on extended cycling of the cells is that metallic zinc can become detached from the negative current collector, due to gas evolution on the anode or due to the flowing electrolyte. Such detached zinc will accumulate at the bottom of the cell. This zinc accumulation can cause clogging of the flow system, and may reduce the amount of zincate available for cycling.

Thus, by providing the catalytic plate 42 at the bottom of the battery housing 12, when the isolated zinc falls and rests on the catalytic plate, a local corrosion cell is created, with the net effect of hydrogen evolution occurring on the plate, and corrosion and dissolution of the isolated zinc. This plate 42 serves to remove any metallic zinc which has become detached by any reason from the anode. Another variant is to electrically connect the catalytic plate to the cathode. Placing the plate at the cathode's potential will also serve to readily dissolve any metallic zinc solids reaching the cell bottom.

As further shown in FIG. 2, the inlet 28 for the flow of electrolyte 24 is located at a lower region of the battery housing 12 and the electrolyte outlet 29 is located at an upper region of the battery housing. This will ensure a vertical flow of electrolyte 24 in the parallel flow channels 42 formed between adjacent electrodes 14, 16. Of course, this arrangement can be reversed, wherein the inlet 28 for the flow of electrolyte 24 is located at an upper region of the battery housing 12 and the electrolyte outlet 29 is located at a lower region.

Figures 5, 6:
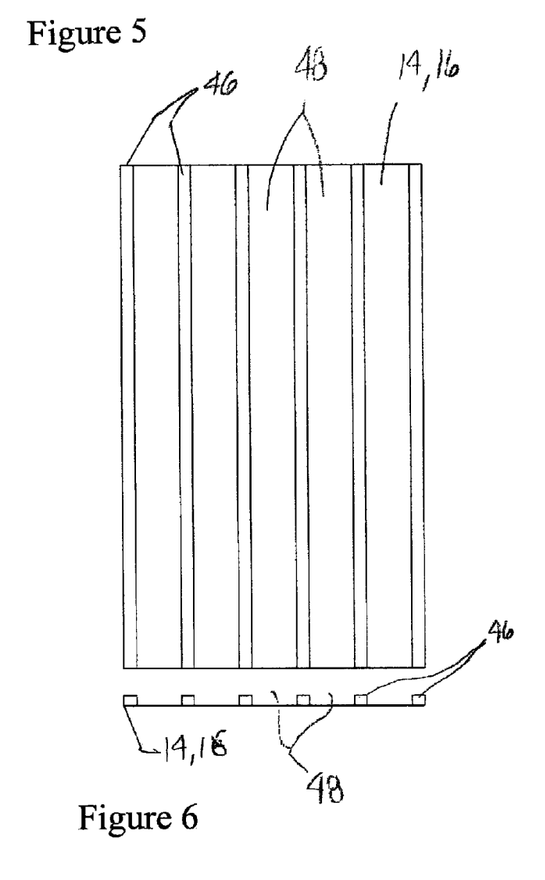
FIG. 5 is a front plan view of an electrode having insulating spacer bars as part of a spacer structure according to an alternative embodiment of the present invention.
FIG. 6 is a bottom view of the electrode shown in FIG. 5.
Figure 7:
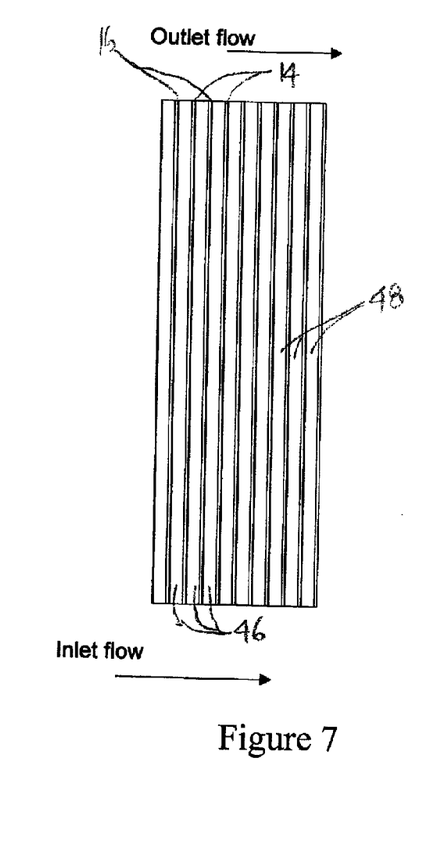
FIG. 7 is a side view of a stack of electrodes shown in FIG. 5.

FIGS. 5-13 show alternative embodiments for the spacer structure 18 according to the present invention. FIGS. 5-7 show a "window frame" insulating spacer arrangement, wherein a series of longitudinal insulating spacer bars 46 are fixed in a vertical, parallel relationship to one or both of the positive and negative electrodes. The spacer bars 46 are laterally spaced from each other to form vertical parallel flow channels 48 between adjacent electrodes.

Figures 8, 9:
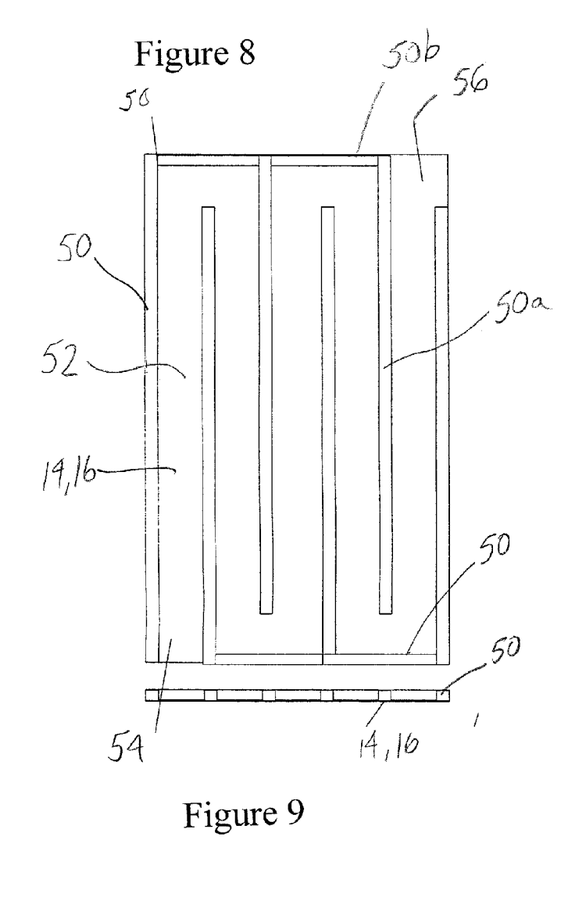
FIG. 8 is a front plan view of an electrode having insulating spacer bars as part of a spacer structure according to another alternative embodiment of the present invention.
FIG. 9 is a bottom view of the electrode shown in FIG. 8.
Figure 10:
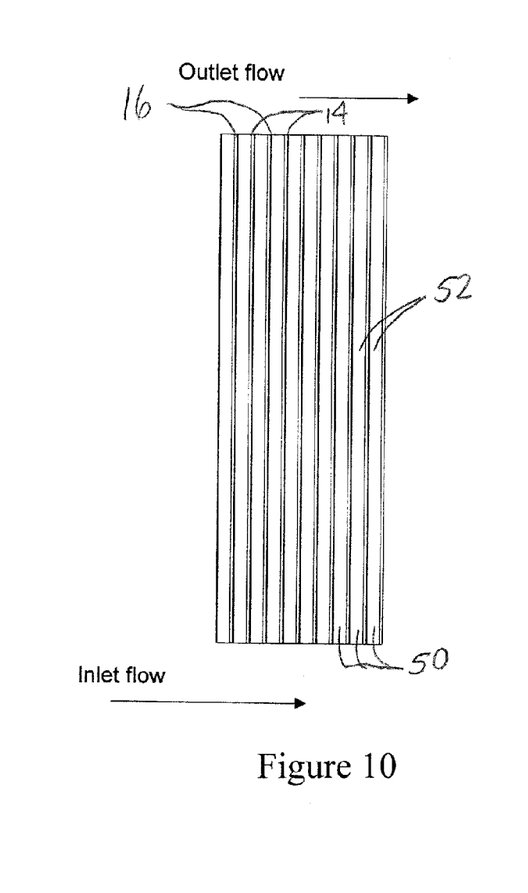
FIG. 10 is a side view of a stack of electrodes shown in FIG. 8.

FIGS. 8-10 show a spacer structure similar to that shown in FIGS. 5-7, but instead of vertical parallel flow channels, insulating spacer bars 50 are arranged on one or both of the positive and negative electrodes to form a continuous serpentine flow channel 52 having an inlet 54 and an outlet 56 between adjacent electrodes. This can be accomplished be providing vertical spacer bars 50a that are shorter in length than the respective electrode 14, 16 and providing horizontal spacer bars 50b to block the ends of the flow channels formed by the vertical spacer bars. As a result, a continuous serpentine flow path 52 is created beginning at one corner of the electrode 14, 16 and terminating at an opposite corner.

Figure 11:
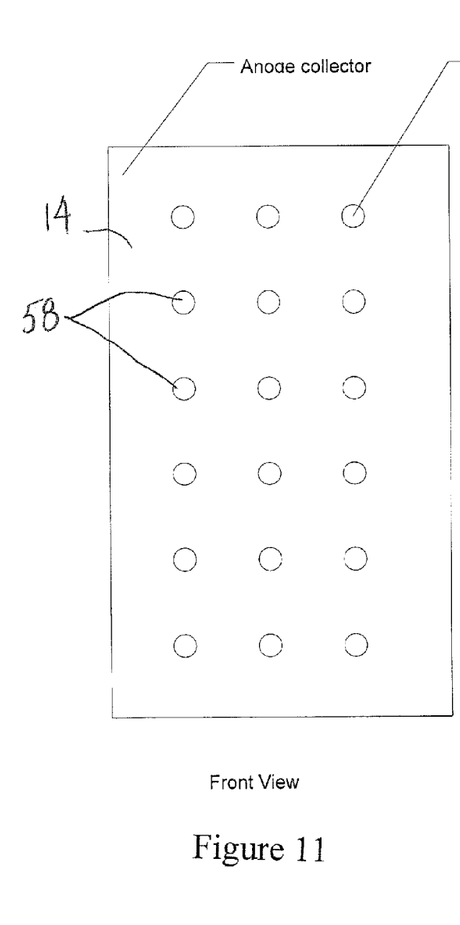
FIG. 11 is a front plan view of an electrode having insulating protuberances as part of a spacer structure according to still another alternative embodiment of the present invention.
Figures 12, 13:
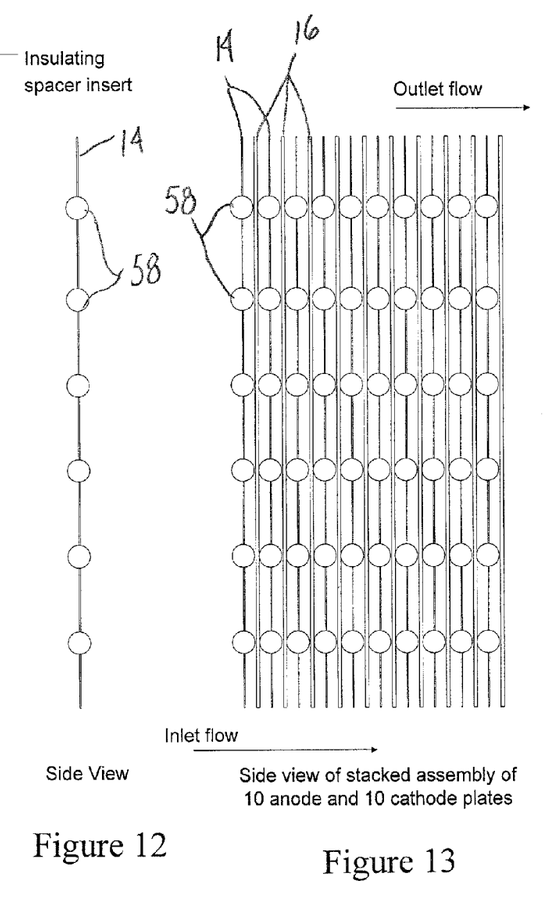
FIG. 12 is a side view of the electrode shown in FIG. 11.
FIG. 13 is a side view of a stack of electrodes shown in FIG. 11.
Figure 14:
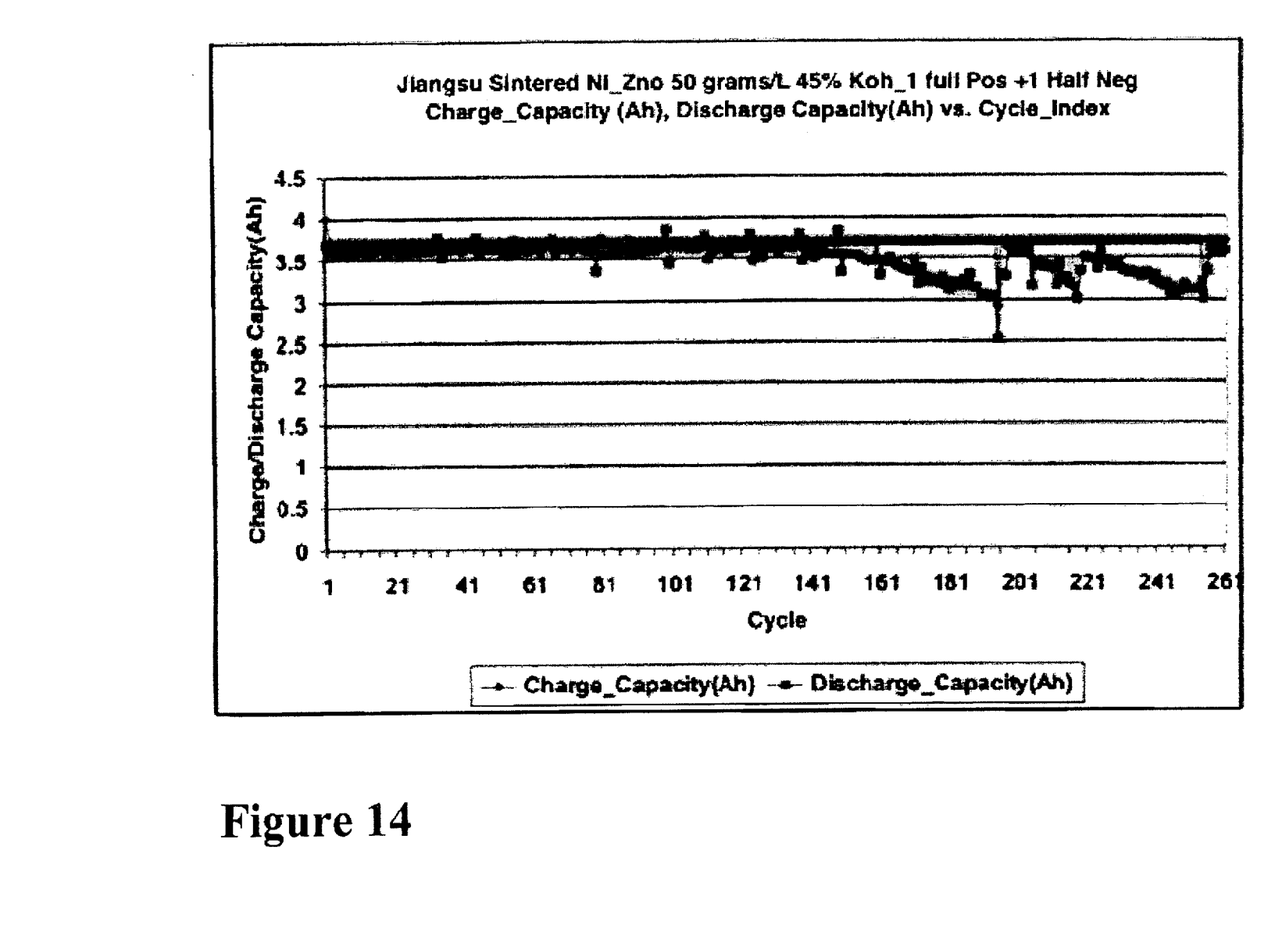
FIG. 14 is a graph showing the performance of a nickel-zinc battery formed in accordance with the present invention, as described in Example 1 set forth below.

FIGS. 11-13 show a still further alternative embodiment of the spacer structure according to the present invention. In this embodiment, both surfaces of only one of the anode and cathode 14, 16 are provided with insulating protuberances 58, which extend outwardly from the surface an equal distance. The protuberances 58 can take the form of insulating spheres, which are press-fit, for example in apertures formed in the electrode. As can be appreciated by those skilled in the art, the design of the spacing structure 18 will determine the flow pattern and characteristics of the electrolyte 24. Thus, alternative flow patterns can include serpentine flow, and linear flow between the plates. Also, by appropriate plate design, series/parallel flow combinations can also be created.

The electrolyte 24 preferably consists of a caustic fluid having a pH of about 14, such as sodium hydroxide or potassium hydroxide. The caustic is preferably highly concentrated (i.e., 20-45% NaOH or KOH). A certain amount of zinc oxide, which will be deposited on the metal sheets 16 during charging of the battery, is dissolved in the electrolyte 24. Quantities ranging from 30 g/L to 200+ g/L have been tested, with an optimal concentration appearing to be about 60 g/L.

In a cycle of operation, zinc oxide in the electrolyte 24 is deposited as metallic zinc on the metal sheets 16 serving as the negative electrodes during charging. Charging is performed at a constant current of, C/2 (i.e., battery capacity (C) over 2 hours), or until an upper voltage limit is reached. 2.0 V has been found to be an appropriate limit, but under normal operation, timed charge control terminates charging before the voltage limit is reached. As the battery discharges in use, the metallic zinc deposited on the negative electrodes 16 is oxidized to form a zinc oxide, which then dissolves back into the alkaline electrolyte 24.

As discussed above, as a conventional nickel-zinc battery cycles, the zinc structures deposited on the negative electrodes become progressively larger, and move toward the nickel electrode. Eventually, this residual zinc will reach the positive electrode causing an electrical shorting condition, and degrading the performance of the battery cell. In addition, it has been found with conventional nickel-zinc batteries that the adhesion of the zinc to its current collector becomes progressively poorer on cycling.

However, with the present invention, continuous pumping of the electrolyte 24 through the battery housing 12 and reservoir 20, using the pump 22, creates a beneficial flow of electrolyte throughout the system. Such flow keeps the electrolyte solution well stirred, thereby ensuring an even, homogenous mixture and temperature of the electrolyte. While the concentration of the zinc in the electrolyte will decrease during charging of the battery, by flowing the electrolyte, the zinc concentration will be kept uniform. This results in a dramatic reduction in the quantity of dendrites forming on the zinc electrode 16 during charging, thereby ensuring a uniform deposition of zinc oxide on the electrodes.

Such electrolyte flow further provides the ability to completely dissolve the zinc oxide from the electrodes 16 during discharge. Specifically, the flow of electrolyte helps to loosen and remove all of the zinc material from the metal substrate 16. Thus, the battery can be provided with a reconditioning cycle, whereby the metallic zinc or zinc oxide can be complete dissolved from the positive electrodes 16.

The object of the reconditioning cycle is to completely dissolve the zinc electrode in the electrolyte, allowing one to return the zinc electrode to its original condition. By completely dissolving the zinc oxide from the electrodes 16, a "clean" substrate is afforded to permit a subsequent uniform deposition of metallic zinc when the cycle repeats. This reconditioning cycle can be performed periodically during the life of the battery to improve performance of the battery and lengthen the life of the battery. For best performance, it has been found that the reconditioning procedure should be performed at least every 20 charge/discharge cycles.

The reconditioning procedure starts with a normally discharged cell, where the end of discharge criterion is a voltage of 1.0 V. The cell is then discharged at a C/5 discharge rate (i.e., the current such that a fully charged battery will take 5 hours to completely discharge), to a final voltage of −0.2 V. It has been found that that this set of conditions leads to negative current collector material, which has been completely cleaned of any zinc metal deposits. This effectively returns the zinc electrode to its initial "as-new" condition.

For best operation, the cell is preferably operated as a closed-loop system. Thus, in a preferred embodiment, any gases evolved from the electrodes (oxygen from the cathode and hydrogen from the anode) are recombined to form water, insuring a constant water inventory in the cell over its life. It has been found that the use of small pieces of catalyst contained within electrolyte-free headspace of the cell is effective in reducing the cell pressure during closed-loop operation. Further, without being bound to any theory, it is believed that this pressure reduction is due to the recombining of hydrogen and oxygen generated during the operation of the cell.

Table I, set forth below, lists the preferred operating parameters of the system according to the present invention.

TABLE I

| Parameter | Minimum | Maximum | Present practice |
|---|---|---|---|
| KOH concentration (w/w %) | 20 | 50 | 45 |
| ZnO concentration (g/L) | 25 | 200 | 60 |
| Flow rate (cc/min-Ah) | 4 | 150 | 600 cc/minute for a 45 Ah cell (13) |
| Nickel electrode capacity (Ah/in2) | 0.1 | 0.3 | 0.18 |
| Negative substrate thickness (in) | 0.002 | 0.01 | 0.005" thick with 10 microinch nickel flash |
| Negative capacity/ positive capacity | 1:1 | 3:1 | 1.5:1 excess zinc based on obtained nickel electrode capacity |
| # cycles before reconditioning | 5 | 50 | <=20 |
| Reconditioning current (C-rate) | C/20 | C/4 | C/5 |
| Reconditioning cutoff voltage (V) | −0.5 | 0 | −0.2 V |

Good performance has been achieved in larger 40 Ah cells using a linear flow velocity of only 0.5 cm/s. This translates to a pumping power required in the present invention that is only 2.5% of conventional electrolyte flow batteries, such as that reported by Zhang, et al.

Example I

A sintered nickel type of nickel oxide positive electrode with the following parameters was used: length=4.5", width=5.5", thickness=0.029", capacity (theoretical) 4.0 Ah, weight=29 g. A polypropylene frame was used, which provided a 0.125" gap between the electrodes. A nickel-plated copper sheet was used as the negative electrode substrate, and the dimensions of the copper sheet were 4.5"×5.5"×0.003". The battery electrolyte was 45% KOH, to which 50 g/L zinc oxide was added. The electrolyte reservoir contained 300 mL of the electrolyte, and the electrolyte was circulated at 300 mL/minute through the gap in the electrodes provided by the spacer.

The performance of the cell is shown in FIG. 2. At cycles 190, 220, and 250, some performance degradation was noted. At each of these cycles, a reconditioning cycle was performed by discharging the cell at 0.75 A to 0.0 V. By driving the cell voltage to zero, a complete stripping of the zinc from the copper sheet substrate was obtained. As a result, the cell performance is greatly improved after such reconditioning cycles. Specifically, over 2,000 cycles have been obtained from a cell constructed in this way, which is a great improvement versus prior art Zn—NiOOH cells.

Another benefit of the present invention is that complex membranes and/or separators, provided between the electrodes to reduce the formation of dendrites, are no longer required. The process of flowing the electrolyte between the electrodes itself drastically retards the formation of dendrites, thereby eliminating the need for such expensive membranes and/or separators. Instead, a simple mechanical structure to provide physical spacing between the electrodes can be used as an electrode separator.

As a result of the present invention, an electrolyte flow-assisted nickel zinc cell battery is provided, which is capable of much greater cycle life than cells of prior art. By using a circulating electrolyte system, the cycle life limitations of the classic sealed, electrolyte-starved Ni—Zn system can be overcome. In this configuration, one can control the zinc electrode's dendritic morphology and shape change, and periodically recondition the zinc electrode to its original new condition.

The battery of the present invention can be used for large scale applications such as utility batteries, load leveling, peak shaving, power quality, etc. Another application of the present invention can be for traction applications such as hybrid light/medium/heavy duty vehicles, and battery electric vehicles. Other possible areas could be in the delivery of high power pulses for military applications (directed energy weapons, electromagnetic launching systems), and aircraft/aerospace applications.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A method for producing energy and increasing the electrochemical energy producing life of a battery having a battery housing, a nickel oxide positive electrode supported in the battery housing, a negative electrode supported in the battery housing and an electrolyte contained within the battery housing, the method comprising the steps of:

charging the battery to a charge voltage, wherein zinc oxide present in the electrolyte is deposited on the negative electrode as metallic zinc;

discharging the battery to a discharge voltage to produce energy, wherein the metallic zinc deposited on the negative electrode is partially dissolved back into the electrolyte;

further discharging the battery to a final voltage below said discharge voltage, wherein the metallic zinc is completely removed from the negative electrode; and actively circulating a flow of electrolyte between the positive electrode and the negative electrode with a pump during said steps of charging, discharging and further discharging the battery to said final voltage, said pump being in fluid communication with said battery housing and an electrolyte reservoir for pumping said electrolyte between said electrolyte reservoir and said positive and negative electrodes in said battery housing, said pump pumping said electrolyte at a flow rate normalized by capacity in a range between 1 cc/minute/Ah and 100 cc/minute/Ah, wherein the metallic zinc is stripped and redeposited on the negative electrode.

2. A method as defined in claim 1, wherein said step of further discharging occurs at a rate equal to or less than C/4 and the battery is discharged to a final voltage of less than 1.0V.

3. A method as defined in claim 1, wherein said negative electrode comprises a metal selected from the group consisting of copper, nickel and steel.

4. A method as defined in claim 3, wherein said negative electrode is plated with a metal selected from the group consisting of nickel, silver, cadmium, tin, lead and bismuth.

5. A method as defined in claim 1, wherein said electrolyte comprises a mixture of caustics selected from the group consisting of sodium hydroxide, potassium hydroxide and lithium hydroxide.

6. A method as defined in claim 5, wherein said electrolyte has a caustic concentration of between 10 weight percent and 50 weight percent.

7. A method as defined in claim 1, wherein said electrolyte comprises zinc in the form of zinc oxide or zinc hydroxide.

8. A method as defined in claim 1, wherein said electrolyte has a zinc metal concentration between 10 g/L and 300 g/L.

9. A method as defined in claim 1, wherein said nickel oxide positive electrode is a sintered nickel oxide electrode.

10. A method as defined in claim 1, wherein said nickel oxide positive electrode is a pasted nickel oxide electrode.

11. A method as defined in claim 1, wherein said positive electrode is an oxygen electrode.

12. A method as defined in claim 1, wherein said positive electrode is an air electrode.

13. A method as defined in claim 1, wherein said battery has a roundtrip energy efficiency greater than 50%.

* * * * *